(12) United States Patent
Shindo et al.

(10) Patent No.: US 9,327,456 B2
(45) Date of Patent: May 3, 2016

(54) METHOD AND APPARATUS FOR MANUFACTURING FIBER-REINFORCED BASE MATERIAL

(71) Applicant: MITSUBISHI HEAVY INDUSTRIES, LTD., Tokyo (JP)

(72) Inventors: Kentaro Shindo, Tokyo (JP); Takao Kuroiwa, Tokyo (JP); Kouji Esaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 169 days.

(21) Appl. No.: 13/773,110

(22) Filed: Feb. 21, 2013

(65) Prior Publication Data

US 2013/0221568 A1 Aug. 29, 2013

(30) Foreign Application Priority Data

Feb. 29, 2012 (JP) .................................. 2012-042638

(51) Int. Cl.
   *B29C 70/38* (2006.01)
   *B29C 43/18* (2006.01)
   *B29C 43/22* (2006.01)
   (Continued)

(52) U.S. Cl.
   CPC .............. *B29C 70/38* (2013.01); *B29C 43/18* (2013.01); *B29C 43/222* (2013.01); *B29C 43/24* (2013.01); *B29C 70/388* (2013.01); *B29C 2043/466* (2013.01); *B29K 2105/06* (2013.01)

(58) Field of Classification Search
   CPC ...... B29C 70/388; B29C 70/386; B29C 70/38
   See application file for complete search history.

(56) References Cited

U.S. PATENT DOCUMENTS

| 3,135,448 | A | * | 6/1964 | Wilson | ............................... | 26/80 |
| 3,810,805 | A | * | 5/1974 | Goldsworthy | ................ | 156/361 |
| 4,541,886 | A | * | 9/1985 | Marlow et al. | ................ | 156/230 |

(Continued)

FOREIGN PATENT DOCUMENTS

| DE | 4002087 A1 | 8/1991 |
| JP | 1247144 | 10/1989 |

(Continued)

OTHER PUBLICATIONS

Office Action mailed Sep. 5, 2014, corresponding to Japanese patent application No. 2012-042638.

(Continued)

*Primary Examiner* — Matthew Daniels
(74) *Attorney, Agent, or Firm* — Kanesaka Berner and Partners LLP

(57) ABSTRACT

It is intended to provide a method and an apparatus for manufacturing a fiber-reinforced base material, which is capable of manufacturing a fiber-reinforced base material of high quality while preventing generation of defects such as wrinkles during stacking of the base material sheet. The method for manufacturing the fiber-reinforced base material formed by stacking a base material sheet including a reinforcement fiber onto a mold having a double-curved surface shape, includes steps of: supplying the base material sheet onto the mold from a base material roll while applying distribution varying in a width direction (X direction) to a length of the base material sheet in a sheet-supplying direction of the base material sheet (Y direction) in correspondence with the double-curved surface shape of the mold; and applying pressure to the base material sheet in contact with the mold.

4 Claims, 7 Drawing Sheets

(51) Int. Cl.
*B29C 43/24* (2006.01)
*B29K 105/06* (2006.01)
*B29C 43/46* (2006.01)

(56) References Cited

U.S. PATENT DOCUMENTS

| | | | | |
|---|---|---|---|---|
| 4,824,513 | A * | 4/1989 | Dodds | 156/382 |
| 4,997,510 | A | 3/1991 | Shinno et al. | |
| 5,074,948 | A | 12/1991 | Greffioz et al. | |
| 6,941,632 | B1 * | 9/2005 | Mead et al. | 29/424 |
| 2006/0073309 | A1 * | 4/2006 | Hogg | 428/156 |
| 2006/0073311 | A1 * | 4/2006 | Hogg | 428/174 |
| 2012/0186730 | A1 | 7/2012 | Shindo et al. | |

FOREIGN PATENT DOCUMENTS

| | | | |
|---|---|---|---|
| JP | 4-062142 | A | 2/1992 |
| JP | 5-254724 | A | 10/1993 |
| JP | 6-039133 | B2 | 5/1994 |
| JP | 2011-136432 | | 7/2011 |
| JP | 2011-136432 | A | 7/2011 |
| JP | 2013-6362 | A | 1/2013 |
| JP | 2013-28062 | A | 2/2013 |
| WO | 2010/108792 | A1 | 9/2010 |

OTHER PUBLICATIONS

International Search Report and Written Opinion mailed May 14, 2013 corresponds to PCT/JP2013/052938.

International preliminary report on patentability mailed Sep. 12, 2014, corresponding to PCT/JP2013/052938.

Decision to Grant a Patent mailed Nov. 21, 2014, corresponding to Japanese patent application No. 2012-042638.

Extended European Search Report in EP Application No. 13755568.6, dated Dec. 23, 2015.

* cited by examiner

FIG.9A (Prior Art)
FIG.9B (Prior Art)
FIG.10A
FIG.10B
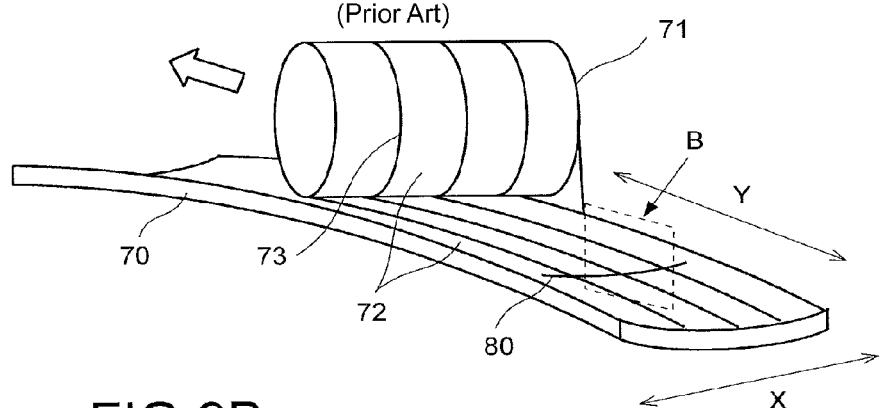
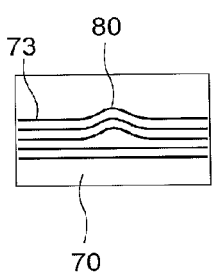
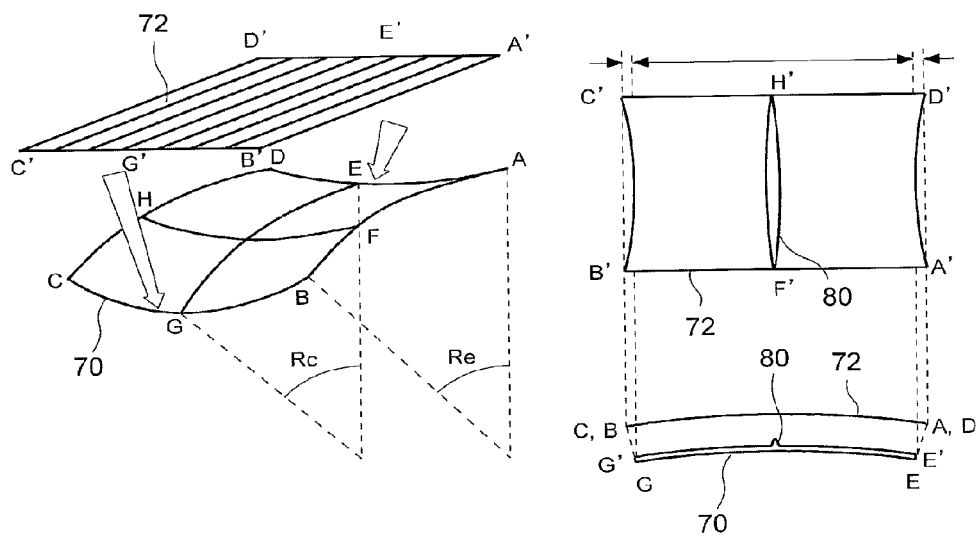

METHOD AND APPARATUS FOR MANUFACTURING FIBER-REINFORCED BASE MATERIAL

RELATED APPLICATIONS

The present application is based on, and claims priority from, Japanese Application Number 2012-042638, filed Feb. 29, 2012, the disclosure of which is hereby incorporated by reference herein in its entirely.

TECHNICAL FIELD

The present invention relates to a method and an apparatus for manufacturing a fiber-reinforced base material which is used as a base material of resin composite including reinforcement fiber.

BACKGROUND ART

Composites such as FRP (Fiber Reinforced Plastic) including reinforcement fiber are lightweight and have high strength. Thus, the composites are increasingly used for components of an airplane, an automobile, a ship, a railroad vehicle and the like.

One method of this type for manufacturing these composites is an autoclave molding method where a plurality of prepreg materials formed by impregnating reinforcement fiber sheet with resin are stacked, covered by a bag film to be vacuumed, and then pressurized and thermally cured by an autoclave. Another method is a vacuum impregnation method where a mold release film and a mesh sheet are arranged on reinforcement fiber sheets stacked on a mold and they are covered by a bag film to be vacuumed while liquid resin is injected inside the bag film to cure.

In these methods for manufacturing the composites, a major part of the stacking operation of base material sheets made of materials such as prepreg materials and reinforcement fiber sheets is manually done. Thus it takes a lot of time and is not effective. In view of improving the operation efficiency and the product quality, a variety of apparatuses for stacking the base material sheets have been proposed.

Disclosed in Patent Literatures 1 and 2 is an apparatus for stacking roving materials formed by impregnating the reinforcement fibers with resin. This apparatus winds the roving material drawn from a supply unit around a stacking roller, and rolls the stacking roller along the mold while pressing the roving material against the mold so as to stack the roving material on the mold. Further, disclosed in Patent Literature 3 is an apparatus for stacking composite material tapes in a continuous manner, where a composite material tape supplied from a material supply reel is pressed onto a stacking member by a roller so as to stack the composite material tapes in a continuous manner.

As a wind turbine blade for instance, there is a blade mold 70 having a shape of a saddle as shown in FIG. 9A. Herein, FIG. 9A and FIG. 9B are illustrations of a conventional method for manufacturing a fiber-reinforced base material. FIG. 9A is a perspective view of the base material sheets stacked on the mold using the base material roll. FIG. 9B is an enlarged cross-sectional view of a section B of FIG. 9A. This blade mold 70 has a double-curved surface shape curving in X direction, i.e. a width direction as well as in Y direction, i.e. a longitudinal direction, a sheet supplying direction of the base material sheet 72. In this case, the base material roll 71 around which the base material sheet 72 is winded rolls in the longitudinal direction of the mold to extend the fiber 73. However, the mold 70 having a double-curved surface shape changes in length depending on a position in the width direction. Thus, by arranging the base material sheet 72 along the mold 70, a wrinkle 80 occurs as shown in FIG. 9B. Particularly, in the case where the fibers 73 are unidirectional reinforcement fibers arranged along the sheet-supplying direction, the unidirectional reinforcement fiber has poor deformability on the mold 70 in in-plane direction unlike cloth fabric and thus it is difficult to fit the unidirectional reinforcement fiber along the curved surface of the mold 70.

Referring to FIG. 10A and FIG. 10B, generation of the wrinkle 80 is described in details. When a flat base material sheet 72 is pressed onto the mold 70 having the saddle shape, the wrinkle 80 occurs in the base material sheet 72. Further, the base material sheet 72 is a unidirectional reinforcement fiber whose fibers are arranged unidirectionally along the longitudinal direction of the mold 70.

As shown in FIG. 10A, the base material sheet 72 is arranged such that its fiber direction coincides with the longitudinal direction of the mold 70. The base material sheet 72 is pressed onto the mold 70 from directly above so as to fit two sides A'D', B'C' of the base material sheet 72 to arcs AD, BC of the mold 70 in the width direction.

FIG. 10B shows a side view of the mold 70 and the base material sheet 72 of FIG. 10A. As shown in a bottom drawing of FIG. 10B, a surface ABCD of the mold 70 (see FIG. 10A) is formed by the arcs AB, DC such that the surface is concave from the arcs AB, DC toward the arc EG. When the mold 70 is viewed from the side, the arc EG is located lower than the arcs AB, DC. Further, the arc length EG is shorter than the arc lengths AB, DC. The surface ABCD of the mold 70 increases in arc length with distance from the arc EG toward the arc AB or DC. In contrast, the surface A'B'C'D' of the base material sheet 72 is flat and thus two sides A'B' and D'C' have the same length as a distance between middle points E'G' in the longitudinal direction. The middle points E', G' are located in the middle between the two sides A'B' and D'C'.

Therefore, the length between the longitudinal middle points E'G' of the base material sheet 72 is greater than that of the arc EG of the mold 70. When the base material sheet 72 is stacked on the mold 70 to fit the sides A'D' and B'C' of the base material sheet 72 to the arcs AD and BC of the mold 70, the wrinkle 80 occurs near a part between widthwise middle points F'H'. The widthwise middle points F', H' are located in the middle between two sides A'B' and D'C' of the base material sheet 72 in the width direction as shown in FIG. 10B. As described above, the surface ABCD of the mold 70 increases in arc length with distance from the arc EG toward the arc AB or DC. This contributes to generation of the wrinkle 80. The number of wrinkles 80 occurring near the widthwise middle points F'H' of the base material sheet, decreases toward the side A'B' or the side D'C' of the base material sheet 72.

Patent Literature 4 discloses an apparatus for stacking the base material sheet without causing wrinkles. The disclosed apparatus is provided with a means for drawing the base material sheet onto the mold and a means for pressing the base material sheet onto the mold. The apparatus supplies the base material sheet onto the mold while loading a tensile force on the base material by the pressing means which is smaller in width than the base material sheet. Upon receiving the tensile force, the base material sheet deforms in the direction of the tensile force so that the base material sheet can be stacked along the shape of the mold without causing wrinkles.

CITATION LIST

Patent Literature

[PTL 1]
JP 6-39133 B
[PTL 2]
JP 4-62142 A
[PTL 3]
JP 5-254724 A
[PTL 4]
JP 2011-136432 A

SUMMARY

Technical Problem

As described above, when stacking the base material sheet onto the mold having a double-curved surface shape according to Patent Literatures 1 to 3, wrinkles are likely to occur. The wrinkles cause a defect in the product, which leads to lower production quality of the fiber-reinforced base material.

In contrast, the apparatus disclosed in Patent Literature 4, deforms the base material sheet so as to generate a relative displacement between a part of the base material sheet pressed by the pressing means and a part of the base material sheet loaded with the tensile force without being pressed. By this, it is possible to remove a difference of the longitudinal length varying in the width direction of the mold. However, if the mold is long, the base material sheet is possibly subjected to large load from repeated deformation in the direction of the tensile force. As a result, this could affect the strength of the fiber-reinforced base material.

In view of the present invention, it is an object of the present invention to provide a method and an apparatus for manufacturing a fiber-reinforced base material, which is capable of manufacturing a fiber-reinforced base material of high quality while preventing generation of defects such as wrinkles during stacking of the base material sheet.

Solution to Problem

According to the present invention, a method for manufacturing a fiber-reinforced base material formed by stacking a base material sheet including a reinforcement fiber onto a mold having a double-curved surface shape, comprises steps of:

supplying the base material sheet onto the mold from a base material roll while applying distribution varying in a width direction to a length of the base material sheet in a sheet-supplying direction of the base material sheet in correspondence with the double-curved surface shape of the mold; and applying pressure to the base material sheet in contact with the mold.

The double-curved surface is a surface formed by collection of curves. More specifically, the curved surface is formed such that a line (a surface element) constituting a surface is a curved surface element and a generating line and a director line are constituted of curves. Herein, assuming that the surface is formed by moving the curve, the moving line is the generating line and the line which defines a movement of the generating line is the director line. If at least one of the generating line or the director line is a straight line, it is possible to press the planar base material sheet against the mold without causing wrinkles. However, the double-curved surface has the generating line and the director line that are both curves. Thus, wrinkles occur when pressing the planar base material sheet against the mold.

Therefore, according to the above method for manufacturing the fiber-reinforced base material, when supplying the base material sheet onto the mold from the base material roll, the distribution varying in the width direction is applied to the sheet length in the sheet supplying direction in correspondence with the double-curved surface shape of the mold. As a result, the base material sheets can be stacked on the mold without causing defects such as wrinkles even on the mold having the double-curved surface shape. This makes it possible to manufacture the fiber-reinforced base material of high quality.

The base material sheet refers to fabric in a sheet form that is made of reinforcement fibers such as glass fibers and carbon fibers. Further, the base material sheet may be a dry fabric which is not impregnated with resin, or may be a prepreg material whose fabric is impregnated with resin. The prepreg material is an intermediate molding material formed by combining reinforcement fiber and uncured resin in advance.

In the above method for manufacturing the fiber-reinforced base material, the base material roll has a circumferential length varying in the width direction so as to apply the distribution to the length of the base material sheet in the sheet-supplying direction, and while supplying the base material sheet onto the mold from the base material roll, an outer periphery of the base material roll is pressed against the mold over the base material sheet so as to apply pressure to the base material sheet in contact with the mold.

The base material roll has a circumferential length varying in the width direction so as to apply the distribution to the length of the base material sheet in the sheet-supplying direction. Thus, even if the mold has the double-curved surface shape, the base material sheet can be easily fit onto the mold without causing wrinkles in the base material sheet. By rolling the base material roll on the mold while pressing the base material roll against the mold, the supplying and pressing of the base material sheet can be performed at the same time, thereby reducing the operation time.

Alternatively, in the above method for manufacturing the fiber-reinforced base material, the base material roll has a circumferential length varying in the width direction so as to apply the distribution to the length of the base material sheet in the sheet-supplying direction, and after supplying the base material sheet onto the mold from the base material roll, the base material sheet is pressed against the mold using an auxiliary roll so as to apply pressure to the base material sheet in contact with the mold.

With the above configuration, even if the mold has the double-curved surface shape, the base material sheet can be easily fit onto the mold without causing wrinkles in the base material sheet. Further, the base material sheet is pressed against the mold by the auxiliary roll after the base material sheet is supplied on the mold from the base material roll. Thus, even if the double-curved surface shape of the mold does not completely match the outer periphery of the base material roll, the auxiliary roll firmly presses the base material sheet against the mold. This enhances the freedom of the shape of the base material sheet.

As another alternative, in the above method for manufacturing the fiber-reinforced base material, a roll gap is formed between a convex roll and a concave roll, the convex roll being a curved roll curving in the width direction so that a diameter is greater in the center than at both ends, the concave roll being arranged parallel to the convex roll and being a curved roll curving in the width direction so that a diameter is smaller in the center than at both ends, the base material sheet drawn from the base material roll is passed through the roll gap so as to apply the distribution to the length of the base material sheet in the sheet-supplying direction, and after supplying the base material sheet having passed through the roll gap onto the mold, the base material sheet is pressed against the mold using an auxiliary roll so as to apply pressure to the base material sheet in contact with the mold.

With the above configuration, the base material sheet drawn from the base material roll is passed through the roll gap formed between the convex roll and the concave roll to deform the base material sheet and thus the distribution varying in the width direction is applied to the length of the base material sheet in the sheet-supplying direction. Therefore, even if the base material roll is cylindrical or has a circumferential length varying in the width direction, a small difference of the circumferential length suffices to make the base material roll winded with the base material sheet. Further, by using replaceable rolls for the roll unit formed by the convex roll and the concave roll, the above method can be used for a variety of molds. Furthermore, the base material sheet is pressed against the mold by the auxiliary roll after the base material sheet is supplied on the mold. Thus, even if the double-curved surface shape of the mold does not completely match the shape of the base material sheet deformed by the roll unit, the auxiliary roll firmly presses the base material sheet against the mold.

In this case, a sheet-bending angle formed around the roll gap between the base material sheet after passing through the roll gap and the base material sheet before passing through the roll gap may be changed so as to adjust the distribution applied to the length of the base material sheet in the sheet-supplying direction.

By changing the sheet-bending angle formed around the roll gap between the base material sheet after passing through the roll gap and the base material sheet before passing through the roll gap, the arc length of the base material sheet contacting the convex roll or the concave roll is adjusted. In correspondence to the change in the arc length, the distribution applied to the sheet length in the sheet supplying direction changes as well. Therefore, the distribution of the base material sheet is adjustable simply by changing the sheet-bending angle of the base material sheet. The sheet-bending angle is an angle formed between: a portion of the base material sheet having passed through the roll gap and having no contact with the convex roll and the concave roll; and a portion of the base material sheet before passing through the roll gap and having no contact with the convex roll and the concave roll. More specifically, the portion having passed through the roll gap is a portion of the base material sheet between the roll unit and the auxiliary roll and the portion before passing through the roll gap is a portion of the base material sheet between the base material roll and the roll unit.

According to the present invention, an apparatus for manufacturing a fiber-reinforced base material formed by stacking a base material sheet including a reinforcement fiber onto a mold having a double-curved surface shape, comprises:

a sheet supply unit for supplying the base material sheet onto the mold from a base material roll while applying distribution varying in a width direction to a length of the base material sheet in a sheet-supplying direction of the base material sheet in correspondence with the double-curved surface shape of the mold; and a sheet contact unit for applying pressure to the base material sheet supplied onto the mold in contact with the mold.

As described above, the sheet supply unit supplies the base material sheet onto the mold from the base material roll while applying distribution varying in the width direction to the length of the base material sheet in a the sheet-supplying direction of the base material sheet in correspondence with the double-curved surface shape of the mold. Thus, the base material sheet can be stacked without causing defects such as wrinkles even on the mold having the double-curved surface shape. This makes it possible to manufacture the fiber-reinforced base material of high quality.

In the above apparatus for manufacturing the fiber-reinforced base material, the sheet supply unit comprises a base material roll whose circumferential length varies in the width direction so as to apply the distribution varying in the width direction to the length of the base material sheet in the sheet supplying direction, the base material roll being rolled along the mold to supply the base material sheet onto the mold, and the sheet contact unit presses the base material roll against the mold when the base material roll is rolled so as to apply pressure to the base material sheet in contact with the mold.

As described above, the sheet supply unit comprises the base material roll whose circumferential length varies in the width direction and the base material roll is rolled along the mold to supply the base material sheet onto the mold. Thus, even if the mold has the double-curved surface shape, the base material sheet can be easily fit onto the mold without causing wrinkles in the base material sheet. Further, the sheet contact unit presses the base material roll against the mold when rolling the base material roll. Thus supplying and pressing of the base material sheet can be performed at the same time.

As one alternative in the above apparatus for manufacturing the fiber-reinforced base material, the sheet supply unit comprises a base material roll whose circumferential length varies in the width direction so as to apply the distribution varying in the width direction to the length of the base material sheet in the sheet supplying direction, the base material roll being rolled along the mold to supply the base material sheet onto the mold, and the sheet contact unit comprises an auxiliary roll for pressing the base material sheet arranged on the mold against the mold so as to apply pressure to the base material sheet in contact with the mold.

The manufacturing apparatus is provided with the sheet supply unit. In a manner similar to the above, even if the mold has the double-curved surface shape, the base material sheet can be easily fit onto the mold without causing wrinkles in the base material sheet. Further, the sheet supply unit comprises the auxiliary roll for pressing the base material sheet arranged on the mold against the mold. Thus, even if the double-curved surface shape of the mold does not completely match the outer periphery of the base material roll, the auxiliary roll can firmly press the base material sheet against the mold. This enhances the freedom of the shape of the base material sheet.

As another alternative in the above apparatus for manufacturing the fiber-reinforced base material, the sheet supply unit comprises a convex roll and a concave roll, the convex roll curving in the width direction so that a diameter is greater in the center than at both ends, the concave roll being arranged parallel to the convex roll and curving in the width direction so that a diameter is smaller in the center than at both ends, the convex roll and the convex roll forming a roll gap therebetween where the base material sheet drawn from the base material roll is passed through so as to apply the distribution to the length of the base material sheet in the sheet-supplying direction, and the sheet contact unit comprises an auxiliary roll for pressing base material sheet against the mold so as to apply pressure to the base material sheet in contact with the mold.

As described above, the sheet supply unit comprises the convex roll and the concave roll and the base material sheet is passed through the roll gap, thereby deforming the base material sheet. In this manner, the distribution varying in the width direction is applied to the length of the base material sheet in the sheet-supplying direction. Therefore, even if the base material roll is cylindrical or has a circumferential length varying in the width direction, a small difference of the circumferential length suffices to make the base material roll winded with the base material sheet. Further, by using replaceable rolls for the roll unit formed by the convex roll and the concave roll, the above apparatus is applicable to a variety of molds. Furthermore, the base material sheet is pressed against the mold by the auxiliary roll after the base material sheet is supplied on the mold. Thus, even if the double-curved surface shape of the mold does not completely match the shape of the base material sheet deformed by the roll unit, the auxiliary roll firmly presses the base material sheet against the mold.

In this case, the above apparatus for manufacturing the fiber-reinforced base material may further comprise an angle adjustor for adjusting a sheet-bending angle around the roll gap between the base material sheet after passing through the roll gap and the base material sheet before passing through the roll gap.

By means of the angle adjustor for adjusting the sheet-bending angle, the distribution of the base material sheet is adjustable simply by changing the sheet-bending angle of the base material sheet. The angle adjustor may be, for instance, a means for adjusting relative positions of at least two of the base material roll, the roll unit or the auxiliary roll. By adjusting the relative positions, the sheet-bending angle can be adjusted.

Advantageous Effects

According to the present invention, when supplying the base material sheet onto the mold from the base material roll, the distribution varying in the width direction is applied to the length of the sheet in the sheet supplying direction in correspondence with the double-curved surface shape of the mold. As a result, the base material sheet can be stacked on the mold without causing defects such as wrinkles even on the mold having the double-curved surface shape. This makes it possible to manufacture the fiber-reinforced base material of high quality.

BRIEF DESCRIPTION OF DRAWINGS

FIG. 9A is a perspective illustration of a base material sheet being stacked on the mold using a base material roll according to a conventional method for manufacturing the fiber-reinforced base material.

FIG. 9B is an enlarged-cross-sectional view of a section B of FIG. 9A.]

FIG. 10A is an explanatory view of generation of wrinkles in the base material sheet.

FIG. 10B is a flat view of FIG. 10A.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

FIRST EMBODIMENT

Figure 1:
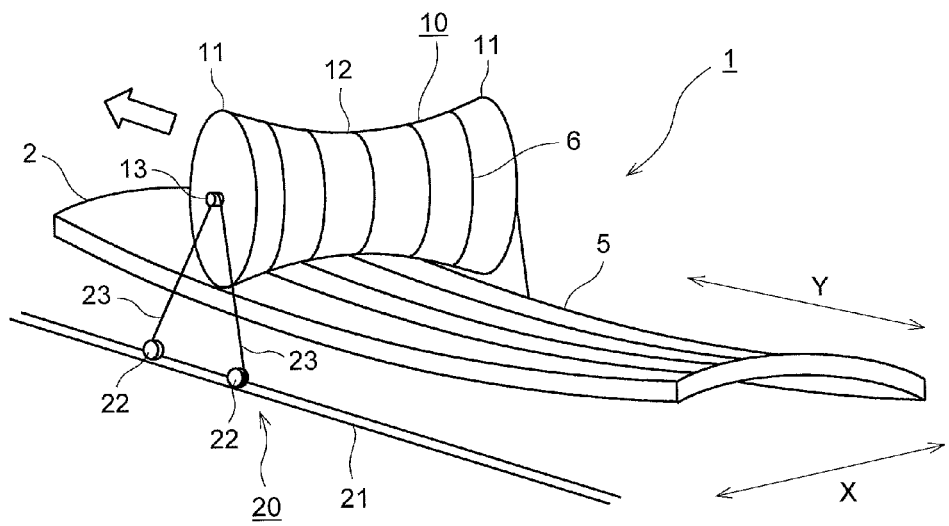
FIG. 1 is a perspective view of an apparatus for manufacturing a fiber-reinforced base material according to a first embodiment of the present invention.

In reference to FIG. 1, an apparatus for manufacturing a fiber-reinforced base material according to a first embodiment of the present invention is explained. The manufacturing apparatus 1 according to the present embodiment makes a stacked product by stacking a base material sheet including a reinforcement fiber 6 on a mold 2 having a double-curved surface shape. The stacked product is used, for instance, as a preform when making a fiber reinforced plastic composite using an autoclave molding method, vacuum impregnation method or the like. The base material sheet 5 herein refers to fabric in a sheet form that is formed of reinforcement fiber 6 such as glass fiber and carbon fiber. Further, the base material sheet 5 may be dry fabric which is not impregnated with resin, or may be a prepreg material whose fabric is impregnated with resin. The present embodiment is particularly applicable when the reinforcement fiber 6 is unidirectional reinforcement fiber arranged in a longitudinal direction of the mold 2 (a sheet-supplying direction).

The manufacturing apparatus 1 for the fiber-reinforced base material according to the present embodiment is mainly provided with a base material roll 10 serving a dual function as a sheet supply unit and a sheet pressing unit, and a transferring mechanism 20 for transferring the base material roll 10 in the longitudinal direction of the mold 2.

The base material roll 10 has a circumferential length varying in the width direction so as to apply a distribution varying in the width direction to the length of the base material sheet 5 in the sheet-supplying direction. Herein, the sheet-supplying direction is a direction indicated by Y in the drawing and the width direction is a direction indicated by X in the drawing. The drawing shows the base material roll 10 having a concave drum shape as an example. The base material roll 10 is a concave roll (concave in cross-section) curving in the width direction so that a diameter is smaller in the center 12 than at both ends 11. The difference of the circumferential length in the width direction corresponds to the double-curved surface shape of the mold 2. The drawing also shows the mold 2 of a saddle shape. Configuration examples of the mold 2 are described later in details. Further, the shape of the outer periphery of the base material roll may be curved in correspondence with the shape of the mold 2.

The base material sheet 5 is winded around the outer periphery of the base material roll 10. More specifically, the base material sheet 5 is winded around the outer periphery of the base material roll 10 having the circumferential length varying in the width direction and thus the length of the base material sheet 5 in the longitudinal direction varies in the width direction.

The base material roll 10 is rotatably connected to a transferring mechanism 20. The base material roll 10 is rollable along the mold 2 to supply the base material sheet 5 onto the mold 2. Further, the base material roll 10 presses the base material sheet 5 against the mold 2 while rotating and moving, so as to apply pressure to the base material sheet in contact with the mold 2. In this process, the pressure may be applied to the base material sheet 5 in contact with the mold 2 using the weight of the base material roll 10 or by pressing the base material roll 10 against a surface of the base material sheet 5 using an actuator (not shown) connected rotatably to a shaft 13 of the base material roll 10.

The transferring mechanism 20 includes a pair of transferring rails 21 arranged on both sides of the mold 2 along the longitudinal direction, a pair of transferring rollers 22 rotating on the pair of transferring rails 21, and support rods 23 supporting the shaft 13 of the base material roll 10 rotatably to the transferring rollers 22. A power means (not shown) applies a force to the shaft 14 of the base material roll 10 in a direction indicated by an arrow in FIG. 1. As a result, the transferring rollers 22 rotate on the transferring rails 21 to move the base material roll 10 along the transferring rails 21. Herein, the power means may be configured, for instance, such that the shaft 13 is manually moved via a handle (not shown) connected rotatably to the shaft 13, or such that the shaft 13 is automatically moved by a driving mechanism connected rotatably to the shaft 13. The transferring mechanism may be configured to move the shaft 13 by rotating and moving the transferring rollers 22 by the driving mechanism connected to the transferring rollers 22.

In reference to FIG. 1, a method for manufacturing the fiber-reinforced base material according to the present embodiment is described. Herein, the base material sheet 5 is stacked on the mold 2 of the wind turbine blade as an example.

As shown in FIG. 1, the manufacturing apparatus 1 for manufacturing the fiber-reinforced base material moves the base material roll 10 on the mold 2 along the transferring rails 21 by moving the shaft 13 of the base material roll 10 in the longitudinal direction of the mold 2 using the power means (not shown). In response to the movement, the base material roll 10 rolls over the mold 2 to supply the base material sheet 5 onto the mold 2 from the base material roll 10 and at the same time presses the base material sheet 5 against the mold 2. Meanwhile, as the base material roll 10 has the circumferential length varying in the width direction (X direction) in correspondence to the double-curved surface shape of the mold 2 so as to apply distribution varying in the width direction to the sheet length in the sheet supplying direction (Y direction) when supplying the base material sheet 5 onto the mold 2. Then, once supplying and pressing the base material sheet 5 over the entire length of the mold 2, the base material roll 10 is returned so as to move the base material roll 10 over the mold 2 again. In this manner, supplying and pressing of the base material sheet 5 over the entire length of the mold 2 are repeated to stack the base material sheets 5 on the mold 2.

As described above, in the present embodiment, when supplying the base material sheet 5 onto the mold 2 from the base material roll 10, the distribution varying in the width direction is applied to the length of the base material sheet 5 in the sheet supplying direction in correspondence to the double-curved surface shape of the mold 2. Thus the base material sheet 5 can be stacked without causing defects such as wrinkles even on the mold having the double-curved surface shape. This makes it possible to manufacture the fiber-reinforced base material of high quality.

By varying the circumferential length of the base material roll 5 in the width direction, the distribution can be applied to the sheet length in the sheet-supplying direction. Thus, even if the mold has the double-curved surface shape, the base material sheet 5 can be easily deformed to fit onto the mold 2 without causing wrinkles in the base material sheet 5. By rolling the base material roll 5 on the mold 2 while pressing the base material roll 5 against the mold 2, the supplying and pressing of the base material sheet 5 can be performed at the same time, thereby reducing the operation time.

SECOND EMBODIMENT

Figure 2:
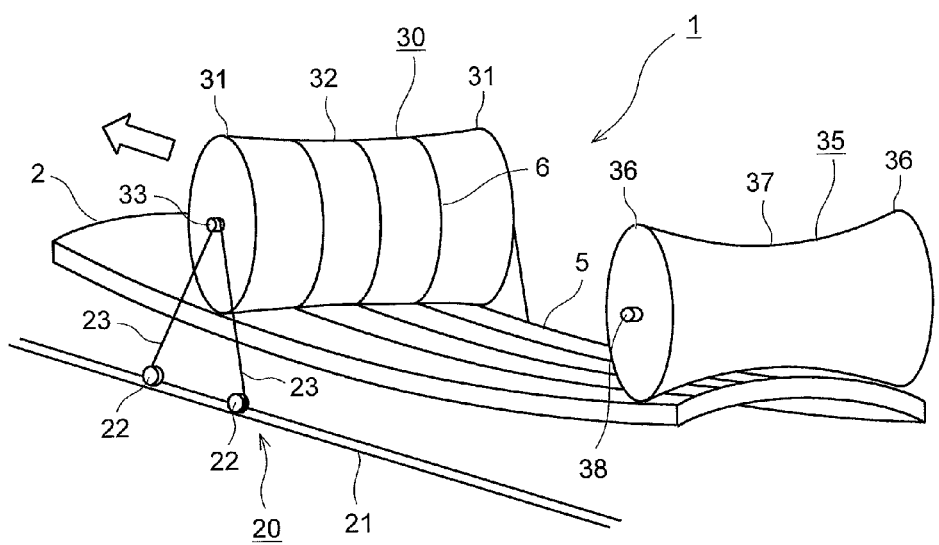
FIG. 2 is a perspective view of an apparatus for manufacturing a fiber-reinforced base material according to a second embodiment of the present invention.
Figure 3:
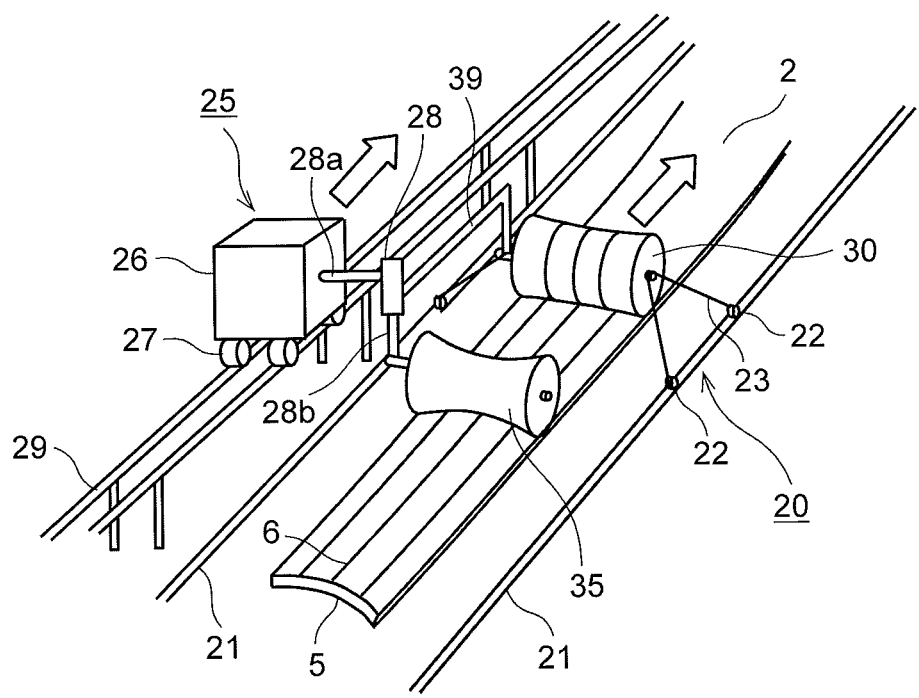
FIG. 3 is an illustration of a detailed example of the apparatus shown in FIG. 2.

In reference to FIG. 2 and FIG. 3, the apparatus for manufacturing the fiber-reinforced base material is described. FIG. 2 is a perspective view of the apparatus for manufacturing the fiber-reinforced base material according to a second embodiment of the present invention. FIG. 3 is an illustration of a detailed example of the apparatus shown in FIG. 2. The same reference numerals are given without adding explanations for those parts that are the same as the first embodiment and parts different from the first embodiment are mainly explained here.

The apparatus for manufacturing the fiber-reinforced base material according to the present embodiment is mainly provided with a base material roll 30 as the sheet supply unit, an auxiliary roll 35 as the sheet pressing unit, the transferring mechanism 20 for transferring the base material roll 30 in the longitudinal direction of the mold 2 and a driving mechanism for driving the auxiliary roll 35 in the longitudinal direction of the mold 2.

The base material roll 30 has a circumferential length varying in the width direction so as to apply a distribution varying in the width direction to the length of the base material sheet 5 in the sheet-supplying direction. The difference of the circumferential length in the width direction may correspond to the double-curved surface shape of the mold 2. However, this is not limitative and the difference of the circumferential length may be smaller than the double-curved surface shape. The drawings show the base material roll 30 having a concave drum shape as an example. The base material roll 30 is a concave roll (concave in cross-section) curving in the width direction so that a diameter is smaller in the center 32 than at both ends 31. The base material sheet 5 is winded around the outer periphery of the base material roll 30 and the length of the base material sheet 5 varies in the width direction. The base material roll 30 is rotatably connected to the transferring mechanism 20. The base material roll 30 is rollable along the mold 2.

The auxiliary roll 35 has a circumferential length varying in the width direction to correspond to the double-curved surface shape of the mold 2. The drawings show the auxiliary roll 35 having a concave drum shape as an example. The auxiliary roll 35 is a concave roll (concave in cross-section)

curving in the width direction so that a diameter is smaller in the center 37 than at both ends 36.

The auxiliary roll 35 is arranged downstream from the base material roll 30 in the transferring direction with a certain distance from the base material roll 30. Further, a shaft 38 of the auxiliary roll 35 is connected rotatably to a driving mechanism 25. The auxiliary roll 35 is rolled on the mold in the longitudinal direction by the driving mechanism 25. The distance between the auxiliary roll 35 and the base material roll 30 may be fixed or variable. The auxiliary roll 35 and the base material roll 30 may move in conjunction or move independently. FIG. 3 shows an example where the auxiliary roll 35 and the base material roll 30 are connected by a connection frame 39 so that the auxiliary roll 35 and the base material roll 30 move in conjunction with each other.

The auxiliary roll 35 rolls on the base material sheet 5 supplied by the base material roll 30 and presses the base material sheet 5 against the mold 2 so as to apply pressure to the base material sheet 5 in contact with the mold 2. In this process, the pressure may be applied to the base material sheet 5 in contact with the mold 2 using the weight of the auxiliary roll 35 or by pressing the auxiliary roll 35 against a surface of the base material sheet 5 by means of an arm 28 attached to the driving unit 25 so as to apply pressure to the base material sheet 5 in contact with the mold 2. The auxiliary roll 35 may be made of deformable material such as silicon rubber and is applicable to be used for a mold having a curve shape varying in the width direction.

The driving mechanism 25 includes a base housing a motor, traveling rollers 27 attached to a bottom of the base 26, an arm 28 attached to the base at one end and attached to the auxiliary roll 35 at the other end, and traveling rails 28 arranged beside the mold 2 along the mold 2.

The traveling rollers 27 are rotated by the motor housed in the base 26 and roll on the traveling rails 29. The arm 28 is formed by an arm part 28a extending horizontally, and an actuator 28b arranged between the arm part 28a and the auxiliary roll 35. As the actuator 28b, a hydraulic cylinder, a motor cylinder and the like can be used, for example. The actuator 28b is extendible in a vertical direction and its extendible side is attached to the shaft 38 of the auxiliary roll 35. As a result, by driving the actuator 28b, the shaft 38 of the auxiliary roll 35 is pressed downward in the vertical direction, i.e. toward the base material sheet 5.

In reference to FIG. 2 and FIG. 3, the method for manufacturing the fiber-reinforced base material according to the present embodiment is described.

As shown in FIG. 3, the manufacturing apparatus 1 for manufacturing the fiber-reinforced base material moves, in the longitudinal direction of the mold 2, the base material roll 30 connected to the auxiliary roll 35 via a support frame 39 by moving the shaft 38 of the auxiliary roll 35 in the longitudinal direction of the mold 2 using the driving mechanism 25. In this process, by means of the transferring mechanism 20 connected to the shaft 33 of the base material roll 30, the base material roll 30 moves on the transferring rails 21 along the mold 2.

In response to the movement, the base material roll 30 rolls on the mold 2 to supply the base material sheet 5 onto the mold 2 from the base material roll 30. Meanwhile, as the base material roll 30 has the circumferential length varying in the width direction in correspondence to the double-curved surface shape of the mold 2 so as to apply distribution varying in the width direction to the sheet length in the sheet supplying direction when supplying the base material sheet 5 onto the mold 2.

The auxiliary roll 35 moving behind the base material roll 30 rolls on the base material sheet 5 supplied from the base material roll 30. The outer periphery of the auxiliary roll 35 is shaped to correspond to the double-curved surface shape of the mold 2. Thus, with rolling of the auxiliary roll 35 on the base material sheet 5, the base material sheet 5 is applied with pressure in contact with the mold 2. The base material sheet 5 may be pressed onto the mold 2 by pressing the auxiliary roll 35 downward in the vertical direction by the actuator 28b.

Once supplying and pressing the base material sheet 5 over the entire length of the mold 2 by the base material roll 30 and the auxiliary roll 35, the base material roll 30 and the auxiliary roll 35 are moved on the mold 2 again. In this manner, supplying and pressing of the base material sheet 5 over the entire length of the mold 2 are repeated to stack the base material sheets 5 on the mold 2.

As described above, according to the present embodiment, the base material sheet 5 can be stacked without causing defects such as wrinkles even on the mold having the double-curved surface shape. This makes it possible to manufacture the fiber-reinforced base material of high quality.

Further, the base material sheet 5 is pressed against the mold 2 by the auxiliary roll 35 after the base material sheet 5 is supplied on the mold 2 from the base material roll 30. Thus, even if the double-curved surface shape of the mold 2 does not completely match the outer periphery of the base material roll 30, the auxiliary roll 35 positively presses the base material sheet 5 against the mold 2. This enhances the freedom of the shape of the base material sheet 5.

THIRD EMBODIMENT

Figure 4:
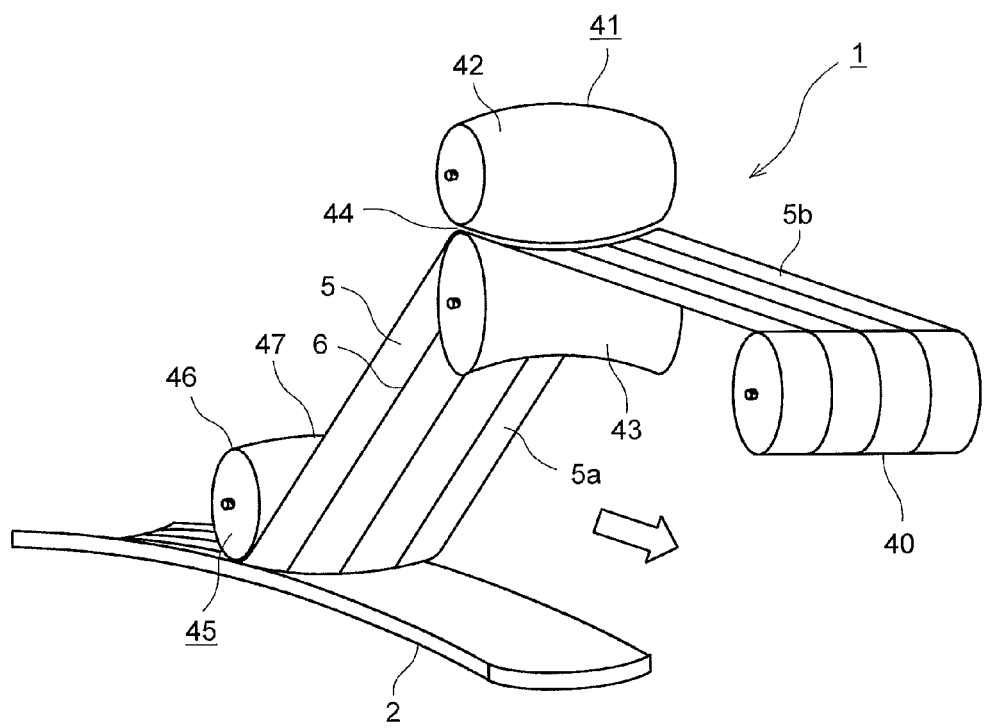
FIG. 4 is a perspective view of an apparatus for manufacturing a fiber-reinforced base material according to a third embodiment of the present invention.
Figure 5:
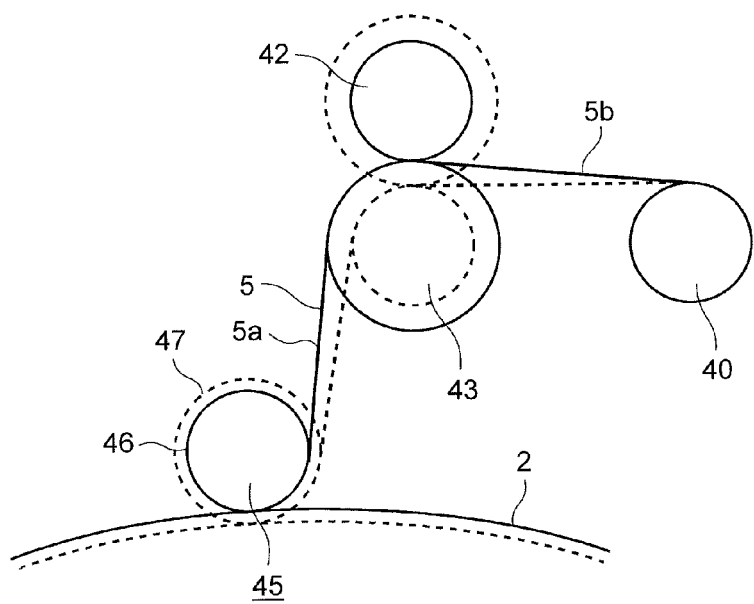
FIG. 5 is a side view of the apparatus shown in FIG. 4.

Described in reference to FIG. 4 and FIG. 5 is the apparatus 1 for manufacturing the fiber-reinforced base material according to a third embodiment. FIG. 4 is a perspective view of the apparatus for manufacturing the fiber-reinforced base material according to the third embodiment of the present invention. FIG. 5 is an illustration of a detailed example of the apparatus shown in FIG. 4. The same reference numerals are given without adding explanations for those parts that are the same as the first and second embodiments and parts different from the first and second embodiments are mainly explained here.

The apparatus 1 for manufacturing the fiber-reinforced base material according to the present embodiment is mainly provided with a base material roll 40 as the sheet supply unit, a convex roll 42 and a concave roll 43, an auxiliary roll 45 as the sheet pressing unit, and a frame 50 supporting the sheet supply unit and the sheet pressing unit, and the transferring mechanism (not shown) for transferring the frame 50 in the longitudinal direction of the mold 2.

Around the base material roll 40, the base material sheet 5 is winded. The base material roll 40 is supported rotatably by the frame 50. The base material roll 40 is formed into a cylindrical shape. Thus the base material sheet 5 winded around the base material roll 40 has a planar shape. Further, the base material roll 40 may be curved a circumferential length slightly varying in correspondence to the double-curved surface shape of the mold 2.

The convex roll 42 may be curved in the width direction (convex in cross-section) so that a diameter is greater in the center than at both ends. The concave roll 43 may be curved in the width direction (concave in cross-section) so that a diameter is smaller in the center than at both ends. The convex roll 42 and the concave roll 43 are arranged adjacent to each other so that their shafts are parallel. Between the outer periphery of the convex roll 42 and the outer periphery of the concave roll 43, a roll gap 44 is formed. The distance of the roll gap 44 is approximately the small as or slightly smaller than the thickness of the base material sheet 40. The convex roll 42 and the concave roll 43 are collectively called as a roll unit 41. The roll unit 41 is configured so that the roll gap is shaped corresponding to the double-curved surface shape of the mold 2. The roll unit 41 may be configured so that the convex roll 42 is approximately as wide as the concave roll 43 and ends of the convex roll 42 are arranged to coincide with ends of the concave roll 43. In this case, the center position of the roll unit 41 in the width direction coincide substantially with the center position of the base material sheet 5 n the width direction as well as the center position of the mold 2 in the width direction. Further, both ends of the roll unit 41 in the width direction coincide with both ends of the base material sheet 5 in the width direction as well as both ends of the mold 2 in the width direction.

In the sheet supply unit having the above structure, the base material sheet 5 drawn from the base material roll 40 passes through the roll gap 44 between the convex roll 42 and the concave roll 43 so that the distribution varying in the width direction is applied to the sheet length in the sheet supplying direction in correspondence to the double-curved surface shape of the mold 2. In such a state that the base material sheet 5 is applied with the distribution, the base material sheet 5 is supplied onto the mold 5. In the present embodiment, the base material sheet 5 may be a prepreg material formed by impregnating a reinforcement fiber sheet with resin to make it easier to maintain the shape formed by going through the roll gap 44.

The auxiliary roll 45 has a circumferential length varying in the width direction to correspond to the double-curved surface shape of the mold 2. The drawings show the auxiliary roll 45 having a concave drum shape as an example. The auxiliary roll 45 is a concave roll (concave in cross-section) curving in the width direction so that a diameter is smaller in the center 47 than at both ends 46.

The auxiliary roll 45 is arranged downstream from the sheet supply unit in the transferring direction with a certain distance from the roll unit 41. The auxiliary roll 45 presses the base material sheet 5 drawn out by the sheet supply unit against the mold 2 so as to apply pressure to the base material sheet 5 in contact with the mold 2. In a manner similar to the second embodiment, the auxiliary roll 45 may be connected to the driving mechanism 25 or may be configured to be applied with a pressing force by the actuator against the mold 2 (see FIG. 4).

Further, the convex roll 42 and the concave roll 43 may each have the circumferential length varying the width direction (a diameter in the width direction) more than the auxiliary roll 45. As a result, even after exiting the auxiliary roll 45, the base material sheet 5 maintains difference of the circumferential length (the difference of the longitudinal length in the width direction) in correspondence to the difference of the circumferential length of the mold 2 (the difference of the longitudinal length in the width direction).

The base material roll 40, the roll unit 41 and the auxiliary roll 45 may each be supported rotatably by a frame (not shown). In this case, the frame is movable in the longitudinal direction along the mold by the driving unit.

The manufacturing apparatus of the present embodiment may also include an angle adjustor for adjusting a sheet-bending angle around the roll gap 44 between a portion 5*a* of the base material sheet portion having passed through the roll gap 44 and a portion 5*b* of the base material sheet before passing through the roll gap 44. The angle adjustor, for instance, is a means for adjusting relative positions of at least two of the base material roll 40, the roll unit 41 or the auxiliary roll 45. By adjusting the relative positions, the sheet-bending angle becomes adjustable.

The sheet-bending angle is an angle formed between: the portion 5*a* of the base material sheet 5 having passed through the roll gap 44 and having no contact with the convex roll 42 and the concave roll 42; and the portion 5*b* of the base material sheet 5 before passing through the roll gap 44 and having no contact with the convex roll 42 and the concave roll 42. More specifically, the portion 5*a* is a portion of the base material sheet 5 between the roll unit 41 and the auxiliary roll 45 and the portion 5*b* is a portion of the base material sheet 5 between the base material roll 40 and the roll unit 41. In the above case, the arc length of the base material sheet 5 contacting the convex roll 42 or the concave roll 42 is adjusted by changing the sheet-bending angle $\alpha$, $\beta$ formed between the portion 5*a* of the base material sheet 5 having passed through the roll gap 44 and the portion 5*b* before passing through the roll gap 44. In correspondence to the change in the arc length, the distribution applied to the sheet length in the sheet supplying direction changes as well. Therefore, the distribution of the base material sheet is adjustable simply by changing the sheet-bending angle of the base material sheet 5.

In reference to FIG. 4 and FIG. 5, the method for manufacturing the fiber-reinforced base material according to the present embodiment is described.

The manufacturing apparatus 1 for manufacturing the fiber-reinforced base material moves in the longitudinal direction the base material roll 40, the roll unit 41 and the auxiliary roll 45 simultaneously by means of the driving mechanism. In response to the movement, the base material sheet 5 is drawn out from the base material roll 4. The base material sheet 5 may be drawn out from the base material roll 40 by winding the base material sheet 5 around the auxiliary roll 45, or may be drawn out by means of a separate unit for drawing out the base material sheet 5.

The base material sheet 5 drawn out from the base material roll 40 passes through the roll gasp 44 of the roll unit 41 and then is supplied onto the mold 2. In this process, the roll gap is shaped corresponding to the double-curved surface shape of the mold 2. Thus, the base material sheet 5 passes through the roll gap 44 between the convex roll 42 and the concave roll 43 so that the distribution varying in the width direction is applied to the sheet length in the sheet supplying direction in correspondence to the double-curved surface shape of the mold 2. In such a state that the base material sheet 5 is applied with the distribution, the base material sheet 5 is supplied onto the mold 5.

Meanwhile, the sheet-bending angle formed between the portion 5*a* having passed through the roll gap 44 and the portion 5*b* before passing through the roll gap 44 may be adjusted by the angle adjustor. The sheet-bending angle may be adjusted in correspondence to the double-curved surface shape of the mold 3. The sheet-bending angle can be adjusted by changing the relative positions of at least two of the base material roll 40, the roll unit 41 or the auxiliary roll 45.

Figure 6A:
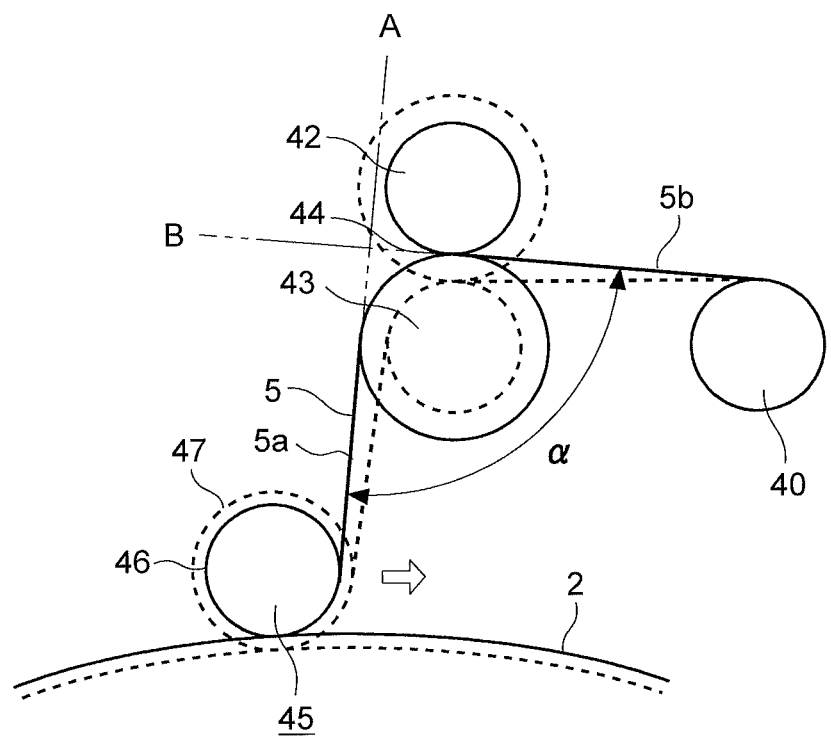
FIG. 6A is a side view of each roll as an explanatory drawing of a configuration example of the third embodiment.
Figure 6B:
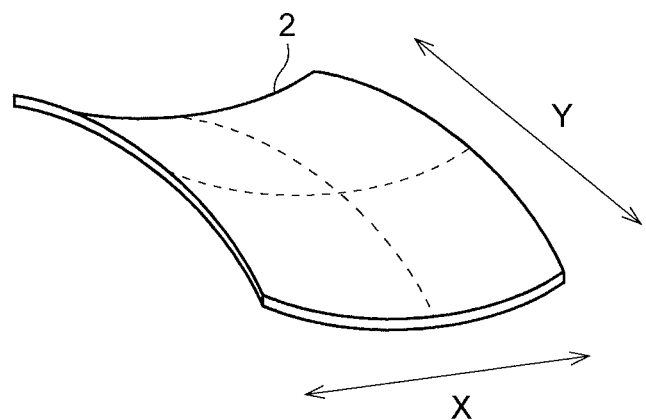
FIG. 6B is a perspective view of a mold in correspondence with the roll.

In reference to FIG. 6A, FIG. 6B, FIG. 7A and FIG. 7B, a configuration example according to the third embodiment is described in details. FIG. 6A is a side view of each roll as an explanatory drawing of a configuration example of the third embodiment. FIG. 6B is a perspective view of a mold in correspondence with the roll.

The configuration of each roll shown in FIG. 6A is substantially the same as that in FIG. 4 and FIG. 5. As shown in FIG. 6A, the sheet-bending angle $\alpha$ is formed between the direction A of the base material sheet 5 having passed through the roll gap 44 and the direction B of the base material sheet before passing through the roll gap 44. The directions A and B are taken at an edge of the base material sheet 5. However, this is not limitative and the directions A and B may be taken in the center of the base material sheet 5 or in any cross section in the width direction of the base material sheet 5. The distribution of the sheet length in the width direction of the base material sheet is adjustable by adjusting the sheet-bending angle α. More specifically, the greater the sheet-bending angle α is, the longer the arc length of the base material sheet 5 contacting the concave roll 43 is. The concave roll 43 has the circumferential length varying in the width direction. Thus, the longer the arc length contacting the concave roll 43 is, the greater the difference of the sheet length in the sheet-supplying direction becomes in the width direction of the base material sheet 5. By changing the sheet-bending angle α, the distribution of the sheet length in the sheet-supplying direction can be adjusted in the width direction of the base material sheet.

The base material sheet 5 supplied onto the mold 2 is pressed by the auxiliary roll 45 rolling on the base material sheet 5 so as to apply pressure to the base material sheet 5 in contact with the mold 2.

Once supplying and pressing the base material sheet 5 over the entire length of the mold 2 by the base material roll 40, the roll unit 41 and the auxiliary roll 45, the frame is turned so as to move the base material roll 40, the roll unit 41 and the auxiliary roll 45 on the mold 2 again. In this manner, supplying and pressing of the base material sheet 5 over the entire length of the mold 2 are repeated to stack the base material sheets 5 on the mold 2.

The manufacturing apparatus having the configuration of FIG. 6A is used in the case where the mold 2 has a saddle shape as shown in FIG. 6B. The mold 2 having the saddle shape has a concave shape in the X direction (the width direction) curving downward toward a center and has a convex shape in the Y direction (the longitudinal direction) curving upward toward the center.

Figure 7A:
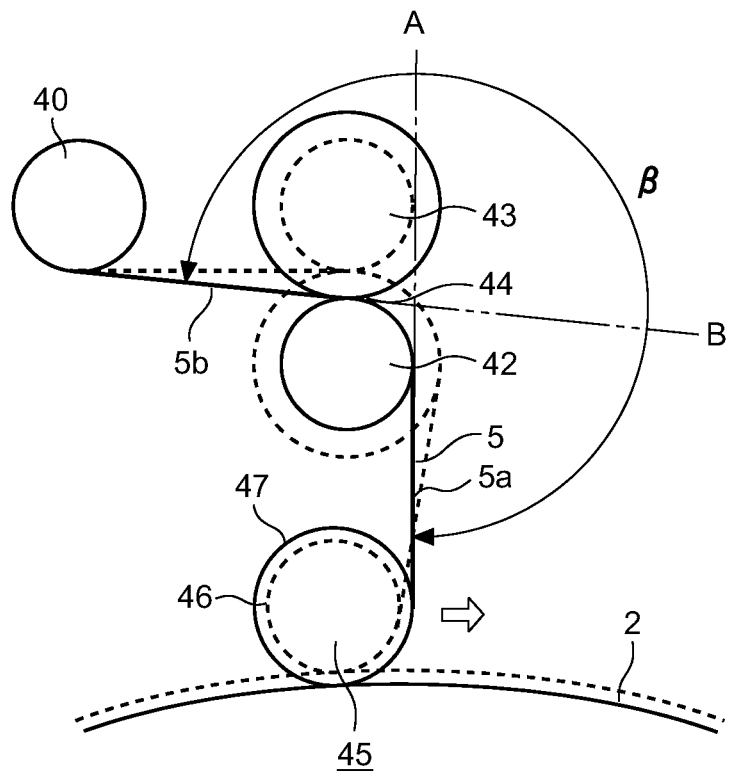
FIG. 7A is a side view of each roll as an explanatory drawing of another configuration example of the third embodiment.
Figure 7B:
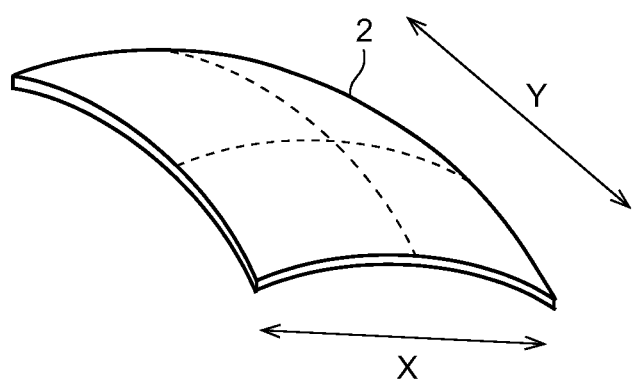
FIG. 7B is a perspective view of a mold in correspondence with the roll.

In contrast, the manufacturing apparatus having the configuration of FIG. 7A is used in the case where the mold 2 has a plate-like shape as shown in FIG. 7B. The mold 2 having the plate-like shape has a convex shape in the X direction (the width direction) curving upward toward a center and has a convex shape in the Y direction (the longitudinal direction) curving upward toward the center.

The roll unit 41 of this manufacturing apparatus is provided with the convex roll 43 on the upper side and the concave roll 42 on the lower side. Further, the auxiliary roll 45 is a concave roll whose diameter 6 is smaller at the center 4 than at both ends 47 in the width direction. The base material roll 40 is arranged downstream from the roller unit 41 in the supply direction of the base material sheet 5. Thus, the sheet-bending angle β formed between the direction A of the base material sheet 5 having passed through the roll gap 44 and the direction B of the base material sheet 5 before passing through the roll gap 44 is greater than 180°. With the above arrangement of each roll and the sheet-bending angle β, the present embodiment is applicable to the mold 2 having the plate-like shape.

Figure 8A:
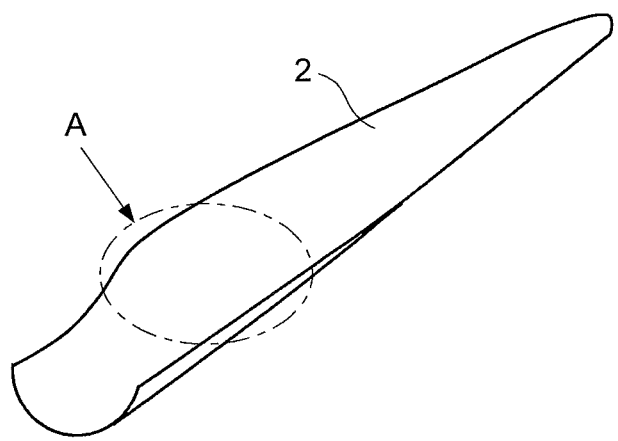
FIG. 8A is a perspective view of a mold used in embodiments of the present invention.
Figure 8B:
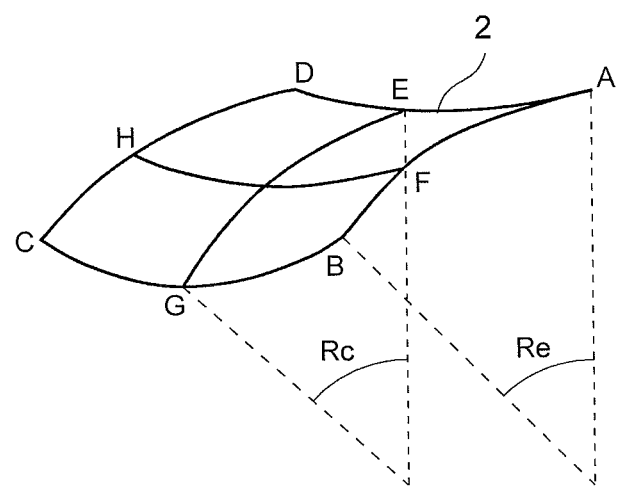
FIG. 8B is an enlarged view of a section A of FIG. 8A.

In reference FIG. 8A an FIG. 8B, a blade mold is explained as a configuration example of the mold used in the present embodiment. FIG. 8A is a perspective view of the mold used in embodiments of the present invention. FIG. 8B is an enlarged view of a section A of FIG. 8A.

As shown in FIG. 8A and FIG. 8B, the blade mold 2 used in the present embodiment is shaped along a shape of a wind turbine blade. The mold 2 for the wind turbine blade can be divided into a pressure side facing the wind and a suction side on the opposite side at a leading edge and a trailing edge as a parting line. The mold 2 of FIG. 8A is the suction side of the blade mold.

The suction-side mold 2 shown in FIG. 8A is placed in such a state that the where the base material sheets 5 (see FIG. 1) are stacked faces upward. The mold 2 extends in the longitudinal direction and curves in a concave shape (a convex downward) in the width direction of the mold 2 (in a direction of a blade chord in a blade section). Further, as shown in FIG. 8B showing an enlarged view of the section A of FIG. 8A, a part of the surface of the mold 2 where the base material sheets 5 are stacked is upward convex in the longitudinal direction of the mold 2 and is concave in the width direction in a shape of a saddle (non-Euclidean). More specifically, the surface of the mold 2 where the base material sheets 5 are stacked is configured such that the longitudinal arcs AB, EG, DC are upward convex and the width-wise arcs AD, EG, BC are concave. Thus the surface ABCD formed by connecting ends A, B, C, D of the arcs has a concave shape overall. The diameter Rc of the arc EG is smaller than the diameter Re of the arcs AB, DC. Further, the mold 2 shown in FIG. 8A and FIG. 8B is just an example and the present embodiment is applicable to molds of any type having a double-curved surface.

As described above, according to the present embodiments, the base material sheet 5 can be stacked without causing defects such as wrinkles even on the mold having the double-curved surface shape. This makes it possible to manufacture the fiber-reinforced base material of high quality.

Further, the base material sheet 5 is passed through the roll gap 44 between the convex roll 42 and the concave roll 43 so as to deform the shape. Thus, the distribution varying in the width direction is applied to the sheet length in the sheet supplying direction. Therefore, even if the base material roll 5 is cylindrical or has a circumferential length varying in the width direction, a small difference of the circumferential length suffices to produce the base material roll 40 winded with the base material sheet 5. Furthermore, by using replaceable rolls for the roll unit 41 formed by the convex roll 42 and the concave roll 43, the above method and apparatus can be used for a variety of molds. Moreover, the base material sheet 5 is pressed against the mold 2 by the auxiliary roll 45 after the base material sheet 5 is supplied on the mold 2. Thus, even if the double-curved surface shape of the mold 2 does not completely match the shape of the base material sheet deformed by the roll unit 41, the auxiliary roll 45 positively presses the base material sheet 5 against the mold 2.

While the embodiments of the present invention have been described, it is obvious to those skilled in the art that the first to third embodiments may be combined as needed and that various changes may be made without departing from the scope of the invention.

Further, the embodiments are applicable to molds of types other than the wind turbine blade. For instance, the embodiments are applicable to molds of structures having the double-curved surface to be used in a wind mill, an airplane, an automobile, a ship, a railroad vehicle and the like.

REFERENCE SIGNS LIST

1 APPARATUS FOR MANUFACTURING FIBER-REINFORCED BASE MATERIAL
5 MOLD
6 BASE MATERIAL SHEET
10, 30, 40 BASE MATERIAL ROLL
20 TRANSFERRING UNIT
21 TRANSFERRING RAIL

22 TRANSFERRING ROLLER
23 SUPPORT ROD
25 MOTOR
26 ARM
27 TRAVELING ROLLER
28 ARM
28a ARM PART
28b ACTUATOR
29 TRAVELING RAIL
35, 45 AUXILIARY ROLL
41 ROLL UNIT
42 CONVEX ROLL
43 CONCAVE ROLL
44 ROLL GAP

The invention claimed is:

1. A method for manufacturing a fiber-reinforced base material formed by stacking a base material sheet including a reinforcement fiber onto a mold having a double-curved surface shape, the method comprising steps of:
   supplying the base material sheet onto the mold from a base material roll wound with the base material sheet; and
   applying pressure to the base material sheet in contact with the mold in such a state that, before the base material sheet arrives at the mold, the base material sheet has distribution of a supplying length of the base material sheet in a width direction of the base material sheet in correspondence with the double-curved surface shape of the mold,
   wherein the base material roll has a circumferential length varying in the width direction so as to apply the distribution to the length of the base material sheet in the sheet-supplying direction, and
   wherein, while supplying the base material sheet onto the mold from the base material roll, an outer periphery of the base material roll is pressed against the mold over the base material sheet so as to apply pressure to the base material sheet in contact with the mold.

2. The method for manufacturing the fiber-reinforced base material according to claim 1, wherein the base material sheet is continuously supplied from the base material roll onto the mold without being cut on the way to the mold.

3. A method for manufacturing a fiber-reinforced base material formed by stacking a base material sheet including a reinforcement fiber onto a mold having a double-curved surface shape, the method comprising steps of:
   supplying the base material sheet onto the mold from a base material roll wound with the base material sheet; and
   applying pressure to the base material sheet in contact with the mold in such a state that, before the base material sheet arrives at the mold, the base material sheet has distribution of a supplying length of the base material sheet in a width direction of the base material sheet in correspondence with the double-curved surface shape of the mold,
   wherein the base material roll has a circumferential length varying in the width direction so as to apply the distribution to the length of the base material sheet in the sheet-supplying direction, and
   wherein, after supplying the base material sheet onto the mold from the base material roll, the base material sheet is pressed against the mold using an auxiliary roll so as to apply pressure to the base material sheet in contact with the mold.

4. A method for manufacturing a fiber-reinforced base material formed by stacking a base material sheet including a reinforcement fiber onto a mold having a double-curved surface shape, the method comprising steps of:
   supplying the base material sheet onto the mold from a base material roll while applying distribution varying in a width direction to a length of the base material sheet in a sheet-supplying direction of the base material sheet in correspondence with the double-curved surface shape of the mold; and
   applying pressure to the base material sheet in contact with the mold,
   wherein a roll gap is formed between a convex roll and a concave roll, the convex roll being a curved roll curving in the width direction so that a diameter is greater in a center than at both ends, the concave roll being arranged parallel to the convex roll and being a curved roll curving in the width direction so that a diameter is smaller in a center than at both ends,
   wherein the base material sheet drawn from the base material roll is passed through the roll gap so as to apply the distribution to the length of the base material sheet in the sheet-supplying direction,
   wherein, after supplying the base material sheet having passed through the roll gap onto the mold, the base material sheet is pressed against the mold using an auxiliary roll so as to apply pressure to the base material sheet in contact with the mold, and
   wherein a sheet-bending angle formed around the roll gap between the base material sheet after passing through the roll gap and the base material sheet before passing through the roll gap is changed so as to adjust the distribution applied to the length of the base material sheet in the sheet-supplying direction.

* * * * *